Sept. 22, 1970     V. F. NERADKA     3,529,613
AC VORTEX RATE SENSOR
Filed June 27, 1968

INVENTOR
VINCENT F. NERADKA

BY

ATTORNEY

United States Patent Office 3,529,613
Patented Sept. 22, 1970

3,529,613
AC VORTEX RATE SENSOR
Vincent F. Neradka, Rockville, Md., assignor, by mesne assignments, to the United States of America as represented by the Secretary of the Navy
Filed June 27, 1968, Ser. No. 740,607
Int. Cl. F15c 1/08, 1/16
U.S. Cl. 137—81.5                    9 Claims

ABSTRACT OF THE DISCLOSURE

The invention is directed to a fluid amplifier whose output is a function of the angular rate applied to it. The amplifier operates as an oscillator. Vortex chambers are located on either side of the main flow path. When an angular rate is applied to the amplifier, the circulation in one vortex chamber increases while the other decreases. This in turn will cause a difference in the output pulses from the amplifier. This difference is a function of the rate applied.

STATEMENT OF GOVERNMENT INTEREST

The invention defined herein may be manufactured and used by or for the Government of the United States of America for governmental purposes without the payment of any royalties thereon or therefor.

BACKGROUND OF THE INVENTION

Field of the invention

The invention pertains to a fluid amplifier. More particularly, this relates to a fluid amplifier which operates as an oscillator whose output is a function of the angular rate applied to it.

Description of the prior art

In the prior art angular rate responsive amplifiers have generally been of the vortex type. The vortex amplifier is cylindrical in shape. It has a drive ring mounted internally and has a sink in at least one of its end plates. The diameter of the sink is small in relation to the diameter of the drive ring. Openings are provided in the sides for entry of fluid. If an angular rate is applied about an axis perpendicular to the plane of the amplifier it will impart a tangential velocity to the fluid entering the vortex chamber of the amplifier. Satisfying the principle of conservation of angular momentum, the tangential velocity of fluid entering the side of the amplifier (through the drive ring) will increase as it approaches the sink, the tangential velocity of the fluid is therefore amplified and is a function of the angular rate applied to the amplifier.

Difficulties have been encountered in the use of the amplified output of vortex amplifiers because they are sensitive to changes in the environmental pressure. This is discussed in a paper by Dexter and Manion, entitled "Design and Performance of a Pure Fluid Course Control System for Naval Application," reprinted in the 1965 Proceedings of AUAA/ION Guidance and Control Conference.

Furthermore, the detection methods for obtaining a useful measurement of the output of the amplifier present a number of drawbacks. These methods utilize either a detector or an amplifier. The detectors which must be used are extremely small and must be constructed with a high degree of accuracy in order to obtain valid results. On the other hand the use of an amplifier adds greatly to the complexity of design and often yields controversial results.

A rate responsive fluid amplifier comprising a power nozzle, interaction chamber and a beam splitter has also been disclosed in the prior art. The results achieved from this amplifier are questionable, however, especially when the fluid issuing from the power stream is the same as the fluid in the interaction chamber. The difference in output obtained when a rate is applied is often too small to be measurable. Furthermore, the placement of the beam splitter is extremely critical. Vortex amplifiers have been found to be more sensitive to an applied rate and despite their drawbacks they have been preferable to this type of amplifier.

SUMMARY OF THE INVENTION

The present invention represents a substantial improvement over the prior art. The amplifier contemplated makes advantageous use of the vortex effect while presenting an output which is a direct function of the angular rate applied to it. It is unaffected by supply pressure. Furthermore, the inventive amplifier has a simple and efficient design and does not require the use of a complex of detection amplifiers and the like to utilize its output. The present amplifier can be made by etching. It is a planer device and requires no special machinery or high degree of quality control in its manufacture.

The fluid amplifier contemplated by this invention is a fluid oscillator which utilizes two vortex chambers. One of these chambers is located on either side of the interaction chamber adjacent to one of the two output passages. When there is no angular rate being applied about the axis perpendicular to the plane of the oscillator, the fluid from the power supply will flow in each output passage for an equal amount of time. When an angular rate is applied, however, the tangential velocity of the fluid in one vortex chamber will increase while the tangential velocity in the other decreases. This in turn sets up a pressure differential across the supply stream which causes the flow in one passage to be maintained for a longer time than the flow in the other passage. This time differential is a direct function of the angular rate applied and may be used as a measure of the angular rate.

It is an object of the present invention to provide a new and improved agular rate resposive device.

It is another object of the present invention to provide a new and improved fluid amplifier which is responsive to angular rate.

It is a further object of the present invention to provide a new and improved fluid amplifier whose output is a direct function of the angular rate applied about the axis perpendicular to its plane.

It is a still further object of the present invention to provide a fluid oscillator which utilizes vortices to obtain an output which is a function of the angular rate applied to it.

Other objects, advantages and novel features of the present invention will become apparent from the following detailed description of the invention when considered in conjunction with the accompanying drawings.

DESCRIPTION OF THE PREFERRED EMBODIMENTS

Figure 1:
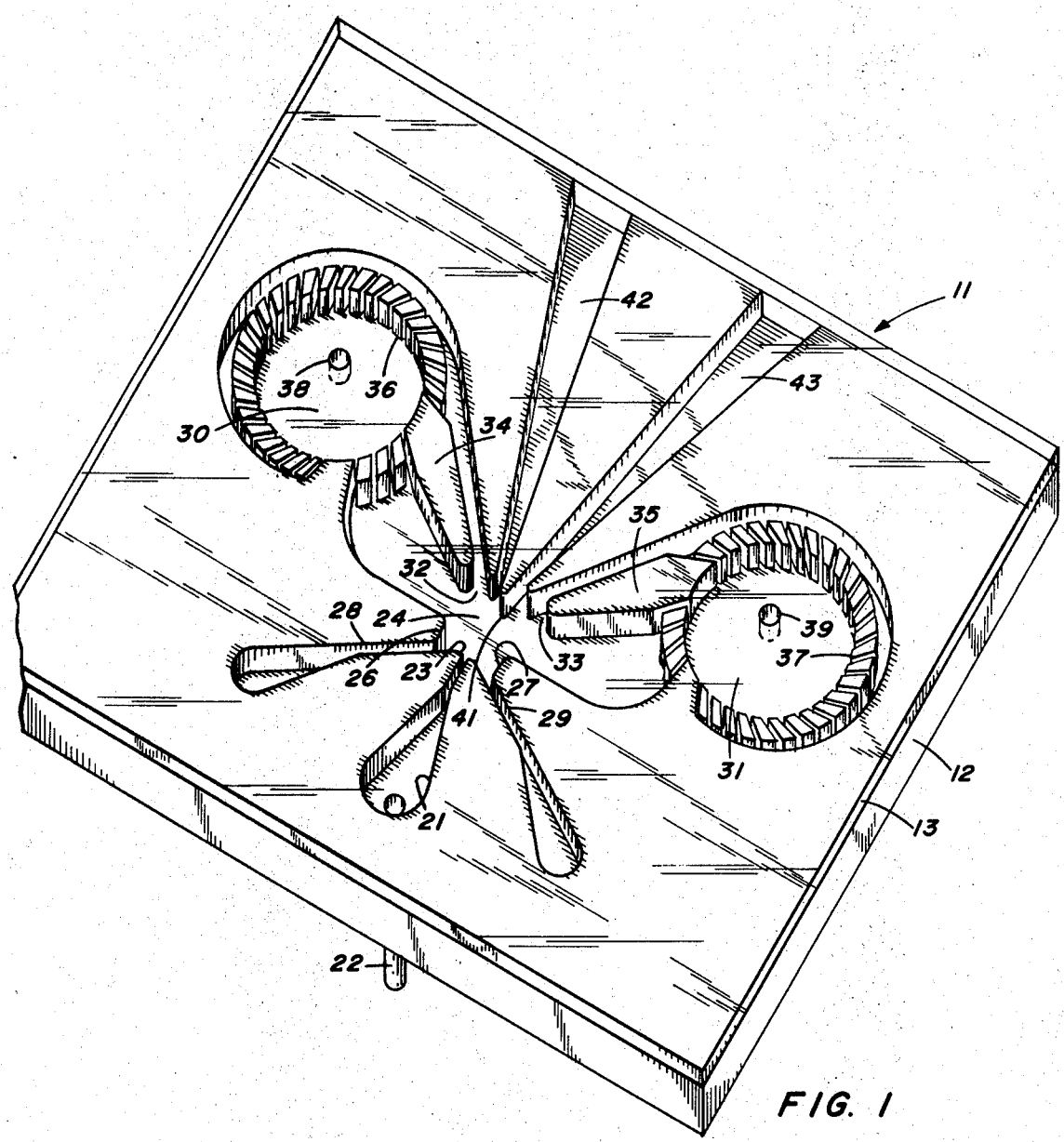
FIG. 1 shows the fluid amplifier contemplated by this invention.

Referring now to FIG 1, the angular rate sensing fluid amplifier 11 is formed in a flat plate 12. The openings and passage therein may be formed by molding, etching, milling or the like.

A second flat plate 13 is attached to plate 12. For purposes of illustration, the top plate 13 is shown composed of a transparent material. Either plate, however, may be made from any material compatible with the fluid employed. The connection between the plates is made fluid tight to insure that the fluid flows only in the defined openings and passages.

A power nozzle 21 is connected to the interaction chamber 24 at end wall 23. A suitable source of fluid 22 is connected to the power nozzle. The interaction chamber is defined by side walls 26 and 27 and end wall 23. Control nozzle 28 and 29 are connected to the interaction chamber at the junction of end wall 23 and side walls 26 and 27, respectively. Vortex chambers 30 and 31 are connected with the interaction chamber 24 at side walls 26 and 27 downstream from the control nozzle. Fluid is directed to and around the vortex chambers 30 and 31 by vanes 34, 35 and 36, 37, respectively. The fluid leaves the vortex chambers through sinks 38 and 39 cut in plate 12.

Interaction chamber 24 ends in output passages 42 and 43 which are separated by beam splitter 41. The amplifier is symetrical about the center line taken through the apex of beam splitter 41 and power nozzle 21. Feedback passages (not shown) are provided downstream in channels 42 and 43. These passages are connected in turn to control nozzles 28 and 29 through suitable passive networks. The frequency of oscillation is determined to the greatest extent by the passive network.

In operation, since perfect symmetry is possible only in theory, power nozzle 21 will be closer to one of the side walls 26 and 27 than it will be to the other. The power stream issuing from nozzle 21 will spread and more of it will initially enter either passage 42 or 43. Oscillation operation is set up through the feedback passages. Part of the power stream passes through the feedback passage connected from the output passage, for example 42, which receives the main part of the power stream, to its respective control nozzle 28 to deflect the main part of the power stream to the other passage 43. The operation is the same when the main part of the flow enters 43 and the power stream is again deflected to passage 42. This operation is seen in FIG. 2a.

Figure 2A:
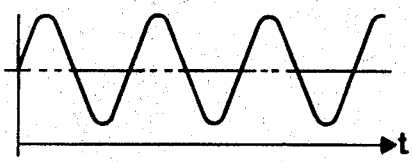
FIG. 2a shows the output waveform of one of the output passages indicative of normal operation of the amplifier.

The output from the amplifier assumes the sinusoidal shape (FIG. 2a). This occurs because the side walls are set back from the power nozzle allowing the beam to spread and preventing boundary layer lock-on or the coanda effect as it is commonly called.

If a square wave output were desired for digital operation, the side walls could be moved closer to the power nozzle in order to achieve lock-on of the power stream with the side walls. A further control nozzle would also have to be provided at each side wall to break the lock-on effect. These nozzles would be connected with feedback passages from the input of each of the vortex chambers.

It should be noted that when the main part of the power stream is flowing in one output passage there will be a small extraneous flow in the other passage (FIG. 2a) and there will also be some extraneous feedback. This extraneous flow is the result of the spreading of the jet due to viscous action.

When the power stream is flowing out output passages 42 and 43, fluid will also flow into vortex chambers 30 and 31, respectively. Vanes 34, 35 and 36, 37 guide the fluid entering the vortex chamber. These vanes are placed at an angle equal to or greater than 45° to a line drawn through the center of the vortex chamber. These vanes aid the vortex chamber in setting up a throttling pressure. The principle is similar to that of a centrifuge where an outward pressure is exerted on a mass. The magnitude of the throttling pressure is a function of the diameter of the vortex chamber and the diameter of the sink. The vortex chambers are located upwards on the sidewalls as near as possible to the power nozzle in order to achieve the maximum throttling possible while at the same time the location is such that sufficient distance is provided to allow the power stream to spread.

In normal operation, no rate is applied to the amplifier and the output of either of the passages shown in FIG. 2a is identical. As seen in FIG. 2a the output of channels 42 and 43 never falls to zero. This results from the extraneous flow as discussed previously.

When an angular rate is applied about an axis perpendicular to the plane of the amplifier, the circulation in one vortex chamber will increase while the circulation in the other decreases. When, for example, an angular rate is applied in the clockwise direction shown in FIG. 1, the circulation will increase in vortex chamber 31. This in turn will increase the throttling effect caused by the vortex. This increased throttling will increase the back pressure on the right side of the stream. As a consequence the pressure which must be applied at the control nozzle 29 to deflect the stream will be lowered. At the same time the circulation in vortex chamber 30 is lowered and the back pressure on the stream is decreased. Consequently, a larger than normal pressure must be applied by control nozzle 28 to effect deflecting of the stream. The operation reverses when the rate is applied in the counter-clockwise direction.

Figure 2B:
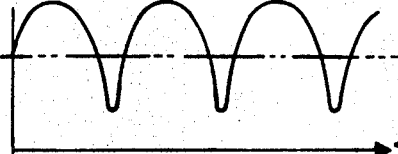
FIG. 2b shows the output waveform with respect to time of output passage 42 when a clockwise rate is applied to the amplifier.
Figure 2C:
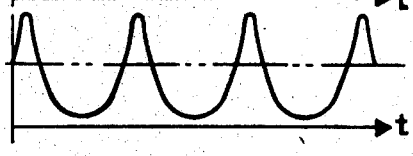
FIG. 2c shows the output waveform with respect to time of output passage 43 when a clockwise rate is applied to the amplifier.

The response of the amplifier to the application of the rate on the outputs of passages 42 and 43 is shown in FIG. 2b and 2c, respectively. As can be seen from the figures, the stream remains in passage 42 longer than in passage 43, thereby lengthening the output pulses from 42 and shortening the pulses from 43. Furthermore, the back pressure on the stream increases the extraneous flow in passage 42 when the stream is flowing out of passage 43 and the back pressure will decrease the extraneous flow in passage 43 when the stream is flowing out passage 42. As seen in FIGS. 2b and 2c, the result will be an increase in the amplitude of the output of passage 42 and a decrease in the amplitude of passage 43.

The length of the output pulses is a function of the angular rate applied and presents an accurate measure of it. No elaborate detectors are necessary to achieve this result. Furthermore, differences in supply pressure will have no effect on the length of these pulses. The length of these pulses will be a function of the applied rate to any supply pressure.

The amplitude of the output pulses is also a measure of the rate applied and at the same time, the amplitude is a function of the supply pressure and varies with it. This measure therefore has the same drawback as the vortex amplifier as discussed previously and would not be used as a measure of applied rate. It may, however, be used to provide an indication of the supply pressure if desired.

There is disclosed then, herein, a novel fluid amplifier which provides an output which is a function of the angular rate applied to it. The amplifier is simply constructed, requires no elaborate detectors and yields accurate results even when supply pressure varies.

Obviously many modifications and variations of the present invention are possible in the light of the above teachings. It is therefore to be understood that within the scope of the appended claims the invention may be practiced otherwise than as specifically described.

What is claimed is:

1. An angular rate responsive fluid amplifier comprising:

an interaction chamber having two side walls and an end wall;

a power nozzle for issuing a main stream of fluid into said chamber between said side walls at said end wall;

a first control nozzle for issuing a control stream into said chamber at one of said side walls;

a second control nozzle for issuing a control stream into said chamber at the other of said side walls;

a first vortex chamber adjacent to one of said side walls; and a second vortex chamber adjacent to the other of said side walls;

one of said vortex chambers being located on either side of said interaction chamber;

said vortex chambers being in flow communication with said interaction chamber and being positioned with respect to said interaction chamber such that when an angular rate is applied about an axis perpendicular to the plane of the amplifier the circulation in one vortex chamber will increase while the circulation in the other decreases thereby varying the differential pressure across said main stream.

2. An angular rate responsive fluid amplifier as in claim 1 further including:
a fluid divider located at the end of said interaction chamber opposite said power nozzle;
said divider forming an output passage with each of said side walls.

3. An angular rate responsive fluid amplifier as in claim 2 wherein
said first and second control nozzles adjoin said side walls immediately adjacent said end wall.

4. An angular rate responsive fluid amplifier as in claim 3 wherein
said first and second vortex chambers adjoin said side walls immediately adjacent said fluid divider.

5. An angular rate responsive fluid amplifier as in claim 4 wherein
each of said vortex chambers has a plurality of vanes for directing the flow of fluid around said chamber.

6. An angular rate responsive fluid amplifier as in claim 5 further comprising:
a first feedback channel connected between one of said control nozzles and one of said passages formed by said fluid divider; and
a second feedback channel connected between the other one of said control nozzles and the other of said passages formed by said fluid divider;
said feedback channels connecting that control nozzle and passage that lie on the same side of a center line taken through the power nozzle and running between the passages.

7. An angular rate responsive fluid amplifier as in claim 6 wherein
the body of said amplifier is formed in a first flat plate.

8. An angular rate responsive fluid amplifier as in claim 7 further comprising:
a second flat plate;
said second plate forming a fluid tight seal with said first plate at the face of which the body of said amplifier is formed.

9. An angular rate responsive fluid amplifier as in claim 8 wherein
a first circular opening is formed in said second plate concentric with said first vortex chamber in said first plate; and
a second circular opening is formed in said second plate concentric with said second vortex chamber in said first plate
the diameters of said first and second openings being small in comparison with the diameters of said vortex chambers.

References Cited
UNITED STATES PATENTS

| | | | |
|---|---|---|---|
| 3,185,166 | 5/1965 | Horton et al. | 137—81.5 |
| 3,280,837 | 10/1966 | Manion | 137—81.5 |
| 3,282,280 | 11/1966 | Horton | 137—81.5 |
| 3,447,383 | 6/1969 | Camarata | 137—81.5X |
| 3,452,768 | 7/1969 | Sieracki | 137—81.5 X |
| 3,452,772 | 7/1969 | Zaloudek | 137—81.5 |
| 3,453,893 | 7/1969 | Ponterio | 137—81.5X |

WILLIAM R. CLINE, Primary Examiner

U.S. Cl. X.R.

73—515